US008750614B2

(12) United States Patent
Maki et al.

(10) Patent No.: US 8,750,614 B2
(45) Date of Patent: Jun. 10, 2014

(54) METHOD AND SYSTEM FOR CLASSIFYING FEATURES IN A VIDEO SEQUENCE

(75) Inventors: Atsuto Maki, Cambridge (GB); Frank Perbet, Cambridgeshire (GB); Bjorn Stenger, Cambridgeshire (GB); Oliver Woodford, Cambridgeshire (GB); Roberto Cipolla, Cambridgeshire (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 291 days.

(21) Appl. No.: 13/239,602

(22) Filed: Sep. 22, 2011

(65) Prior Publication Data

US 2012/0082381 A1 Apr. 5, 2012

(30) Foreign Application Priority Data

Sep. 30, 2010 (GB) .................................. 1016496.0

(51) Int. Cl.
*G06K 9/00* (2006.01)
*G06K 9/62* (2006.01)
*G06K 9/34* (2006.01)

(52) U.S. Cl.
USPC .......................................... 382/170; 382/224

(58) Field of Classification Search
USPC ......... 382/103, 159, 164, 168, 170, 173, 195, 382/197, 218–220, 224; 707/3; 348/699
See application file for complete search history.

(56) References Cited

U.S. PATENT DOCUMENTS

| 6,647,131 | B1 | 11/2003 | Bradski |
| 7,778,466 | B1 | 8/2010 | Medasani et al. |
| 8,451,384 | B2 * | 5/2013 | Gaddy et al. .................. 348/699 |
| 8,472,715 | B2 * | 6/2013 | Yokomitsu et al. ........... 382/170 |
| 2008/0313152 | A1 * | 12/2008 | Yoon et al. ........................ 707/3 |
| 2012/0082381 | A1 * | 4/2012 | Maki et al. .................... 382/170 |
| 2012/0219213 | A1 * | 8/2012 | Wang et al. ................... 382/159 |
| 2013/0129143 | A1 * | 5/2013 | Chen et al. .................... 382/103 |

FOREIGN PATENT DOCUMENTS

| EP | 1 617 376 A3 | 1/2006 |
| EP | 1 677 251 A2 | 7/2006 |
| JP | 11-203481 | 7/1999 |
| JP | 2008-284166 | 11/2008 |
| WO | WO 2009/024349 A1 | 2/2009 |
| WO | WO 2010/119410 A1 | 10/2010 |

OTHER PUBLICATIONS

Navneet Dalai, et al., "Human Detection Using Oriented Histograms of Flow and Appearance," ECCV 2006, Part II, LNCS 3952, pp. 428-441, 2006.

(Continued)

*Primary Examiner* — Amir Alavi
(74) *Attorney, Agent, or Firm* — Oblon, Spivak, McClelland, Maier & Neustadt, L.L.P.

(57) ABSTRACT

According to one embodiment, a method of classifying a feature in a video sequence includes selecting a target region of a frame of the video sequence, where the target region contains the feature; dividing the target region into a plurality cells, calculating histograms of optic flow with the cells comparing the histograms of optic flow for pairs of cells; and assigning the feature to a class based at least in part on the result of the comparison.

19 Claims, 5 Drawing Sheets
(1 of 5 Drawing Sheet(s) Filed in Color)

(56) References Cited

OTHER PUBLICATIONS

Rizwan Chaudhry, et al., "Histograms of Oriented Optical Flow and Binet-Cauchy Kernels on Nonlinear Dynamical Systems for the Recognition of Human Actions," Computer Vision and Pattern Recognition, 2009, CVPR 2009, IEEE Conference. ISSN1063-6319.

Christian Wojek, et al., "Multi-Cue Onboard Pedestrian Detection," in Proceedings of CVPR'2009, pp. 794-801.

Combined Search and Examination Report mailed Jan. 25, 2011, in United Kingdom Patent Application No. GB1016496.0, filed Sep. 30, 2010.

Japanese Office Action issued Oct. 30, 2012, in Patent Application No. 2011-204623 (with English-language translation).

Sho Ikemura, et al., "Real-Time Human Detection Using Local Features Based on Depth Information", The IEICE Transactions on Information and Systems, The Institute of Electronics, Information and Communication Engineers, vol. J93-D, No. 3, Mar. 1, 2010, pp. 355-364.

Takayoshi Yamashita, et al., "Efficient Features for Object Recognition", IEICE Technical Report, The Institute of Electronics, Information and Communication Engineers, vol. 108, No. 328, Nov. 20, 2008, pp. 221-236.

\* cited by examiner

METHOD AND SYSTEM FOR CLASSIFYING FEATURES IN A VIDEO SEQUENCE

CROSS-REFERENCE TO RELATED APPLICATION

This application is based upon and claims the benefit of priority from United Kingdom Patent Application No. 1016496.0 filed on 30 Sep. 2010; the entire contents of which are incorporated herein by reference.

FIELD

Embodiments described herein relate generally to recognising features in a video sequence.

BACKGROUND

There are many applications of feature recognition in video sequences. One such application is pedestrian recognition. In a pedestrian recognition method features in a video sequence are classified either as being pedestrians or not pedestrians.

Pedestrians can have varying motion and appearance in video sequences. Pedestrians may be static, moving in different directions, the appearance of a pedestrian can vary with different walking phases, and pedestrians may be occluded by objects in a video or may be connected to objects such as luggage which can vary the observed shapes for pedestrians in a video sequence.

In order to accurately classify features in a video sequence, for example, as pedestrians video analysis methods must be able to account for some or all of the factors discussed above.

BRIEF DESCRIPTION OF THE DRAWINGS

The patent or application file contains at least one drawing executed in color. Copies of this patent or patent application publication with color drawing(s) will be provided by the office upon request and payment of the necessary fee.

In the following, embodiments of the invention will be described with reference to the drawings in which.

DETAILED DESCRIPTION

According to one embodiment, a method of classifying a feature in a video sequence includes selecting a target region of a frame of the video sequence, where the target region contains the feature; dividing the target region into a plurality of cells, calculating histograms of optic flow with the cells comparing the histograms of optic flow for pairs of cells; and assigning the feature to a class based at least in part on the result of the comparison.

In this embodiment features in the video sequence are recognised by assigning them into classes. The assignment into classes is based on the comparison of histograms of optic flow. An optic flow field for a frame of the video sequence indicates the motion of parts of the frame between frames. The optic flow field may indicate the movement of each pixel of a frame between frames. Alternatively the optic flow field may indicate the movement of blocks of pixels between frames. Histograms of optic flow are calculated for cells of the target region. By comparing the histograms of optic flow, correlations of the motion of different parts of the target region can be identified. These correlations may be indicative of the presence of a particular feature, such as a pedestrian in the frame of the video sequence. As a result of the comparison, the feature in the target region is assigned to a class.

According to one embodiment, the method also includes performing image analysis on the frame of the video sequence. The result of the image analysis and the result of the comparison of the histograms of optic flow are used to classify the feature.

In this embodiment, features in the video are classified based both of motion and the result of the image recognition. This means that both characteristic of the static image, such as shape and characteristics of the motion are used to identify features in the video sequence.

According to one embodiment, the image analysis includes calculating histograms of oriented gradient for a static image corresponding to the target region. Histograms of oriented gradient is a method of recognising shapes in images.

According to one embodiment, a random decision forest is used to assign the feature to a class. The random decision forest is trained prior to carrying out the method using training data. The training data corresponds to a set of video sequences for which the classification is already known.

According to one embodiment, the method is used to identify pedestrians in the video sequence. The feature is assigned to a class by determining whether the feature corresponds to a pedestrian.

According to one embodiment, the optic flow field in each cell includes vectors indicating the magnitude and direction of apparent movement of parts of the frame of the video sequence between frames. Calculating histograms of optic flow includes assigning each vector of optic flow to a bin based on the direction of the vector.

According to one embodiment, the optic flow field for the frame is stored in channels. Each channel corresponds to a range of orientations for the vector of optic flow.

According to one embodiment the optic flow field is stored as an integral image.

According to one embodiment, the method includes compensating for camera motion in the video sequence by subtracting a globally observed optic flow for the target region from the optic flow field in each cell.

According to a further embodiment, a computer readable medium for causing a computer to execute a method according to the embodiments described above is provided.

According to a further embodiment, a video analysis system for carrying out methods according to embodiments described above is provided.

Figure 1:
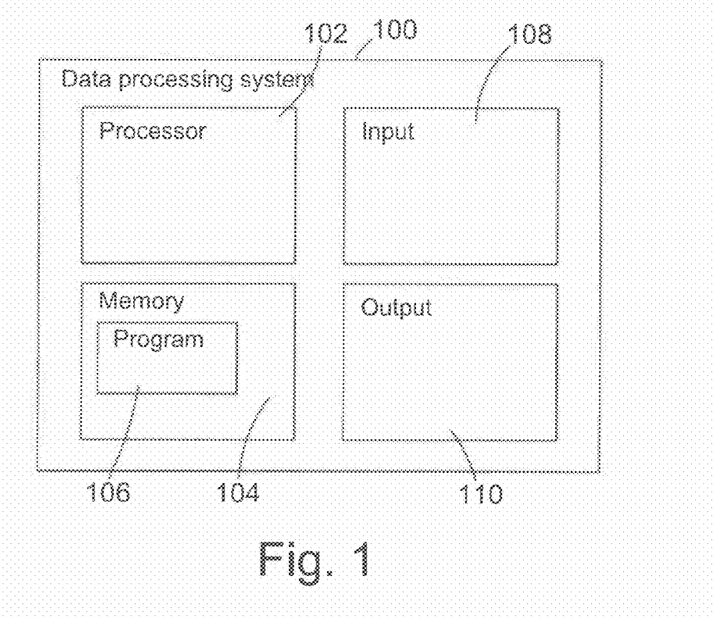
FIG. 1 is a block diagram of a data processing system for classifying a feature in a video sequence.

FIG. 1 shows a data processing system 100 for classifying a feature in a video sequence. The data processing system 100 comprises a processor 102, a memory 104, an input module 108, and an output module 110. The memory 104 stores a program 106 for classifying a feature in a video sequence. The program 106 can be executed on the processor 102. The input module 108 can receive input of a video sequence for analysis to classify a feature in the video sequence and the output module 110 can output the results of the classification. The input module may receive optic flow data indicating movement between frames of the video sequence. Alternatively, the processor may be operable to calculate the optic flow data from an input video sequence. The input module 108 may be a data connection capable of receiving video data from a video camera or video recorder. The input module 108 may be a network connection capable of receiving video data over a network such as the internet. The data processing system 100 may be a conventional computer. The methods followed by the program 106 are described below.

Figure 2:
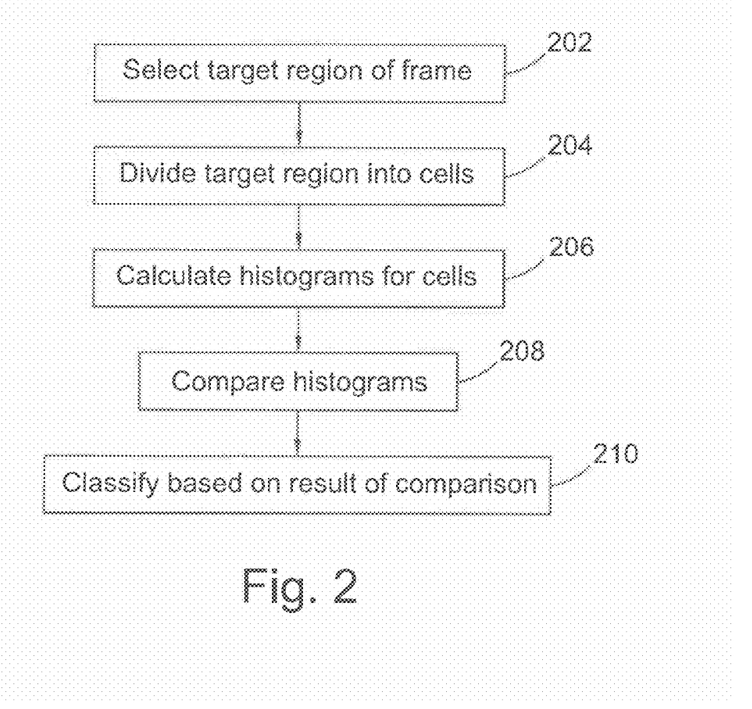
FIG. 2 is a flow diagram of a method for classifying a feature in a frame of a video sequence.

FIG. 2 shows a flow diagram of a method for classifying a feature in a frame of a video sequence. The method uses optic flow data to classify a feature in a video based on correlations in the motion of different parts of the feature. The optic flow data is a field that shows movement between the frames of a video sequence. The optic flow data may indicate the movement of each pixel in a frame with respect to the previous or the next frame in the video sequence. The optic flow data may indicate the movement of a subset of the pixels in frames of the video sequence. For example, the optic flow data could indicate the motion of every other pixel in a frame. The optic flow field includes a magnitude and direction of motion for a set of points in a frame.

Step 202 of the method is selecting a target region of the frame. The following steps of the method are then applied to the target region. The target region could be identified by performing image analysis on the frame and identifying candidate features. Alternatively, all regions having a particular size in a frame could be selected in sequence.

The target region is then divided into a number of cells in step 204. For each cell in the target region, a histogram of optic flow is calculated in step 206. The histograms of optic flow are calculated by assigning the optic flow for each pixel or each unit of optic flow field within the cell to a bin according to the direction of optic flow.

In step 208, histograms of pairs of cells are compared. Using the result of the comparison, the feature in the target region is classified in step 210. The classification is thus based upon correlations of motion of different parts of the target region.

In the above description, the classification is used to indicate the result of the method. The classification may be to one of two classes, for example 'pedestrian' and 'not pedestrian'. Such a classification system would be used to identify pedestrians in a video sequence.

In the following, the method in which a comparison of optic flow at different points in a frame is analysed as described above is called co-occurrence flow (CoF). The CoF method can be used in conjunction with the histograms of gradient (HOG) method to identify pedestrians in a video sequence. The HOG method for the detection of pedestrians is described in N. Dalal and B. Triggs, 'Histograms of oriented gradients for human detection' CVPR (1), pages 886-893, 2005.

In the combined method, HOG features are extracted from an image by first making computations of the oriented edge energy responses by convolving the input image with oriented odd Gabor filters in d (=8) different orientations. This filtering is performed on the whole input image and the results are stored as integral images. The use of integral images which are also known as summed area tables allows computations to be efficiently made for windows of various sizes. The outputs of Gabor filtering in the j-th direction are denoted as $G(j)$ for $j=1, \ldots, d$.

For identifying pedestrians, a window, or target region which is rectangular and has an aspect ratio of 1:2 is used. For this window, features based on the HOG method and the CoF method are calculated. These features are used as inputs for a statistical model such as a random forest classifier, which uses the features to classify the object in the target region of the frame as either a pedestrian or not a pedestrian.

The process for computing features for a target region using HOG is as follows. For a candidate rectangular target region, cells which are sub regions of the target region, R are defined. The cells are grid wise generated in a multi-level fashion as in MIP mapping so that we have $2^l \times 2 \cdot 2^l$ ($l=0, \ldots, l_{max}$) cells in each level. $l_{max}=3$ is chosen as a reasonable number for the finest level. To give a rough idea, this indicates that each cell in the bottom level consists of 8×8 pixels for an R with size 64×128 pixels.

A set of feature elements $f_l(m, n) \in R^d$ are computed from the sum of the outputs of Gabor filtering $\{G(j)\}$ at each orientation channel within the cell. A cell of level, l is referred to as $w_l(m, n)$ for $m=1, \ldots, 2^l$, $n=1, \ldots, 2^l+1$. The set of feature elements is given by the following formula:

$$f_l(m,n) = \{e_l(m,n;j)\}, j=1,\ldots,d$$

$$e_l(m,n;j) = |\int_{w_l(m,n)} G(u,v;j) du dv|$$

Where (u, v) are local coordinates in R. $f_l(m,n)$ is normalised using the filter outputs over all directions. The normalised feature is given by the following formula:

$$\tilde{f}_l(m, n) = \{\tilde{e}_l(m, n; j)\}, j = 1, \ldots, d$$

$$\tilde{e}_l(m, n; j) = e_l(m, n; j) / \frac{1}{d}\sum_{j=1}^{d} e_l(m, n; j)$$

To form a multidimensional HOG descriptor, outputs from coarser scales are incorporated to form $N_G$-dimensional HOG descriptor $V_G$ by concatenating the features of different levels such that:

$$v_G = [\tilde{f}_3\, \tilde{f}_2\, \tilde{f}_1\, \tilde{f}_0]$$

Where $$N_G = d \sum_{l=0}^{l_{max}} 2^l \cdot 2^{l+1}$$

The features $v_G$ calculated as above are used in addition to feature calculated using the co-occurrence flow (CoF) method to classify moving objects in a video as either pedestrians or not pedestrians.

To identify pedestrians, the CoF method can be implemented to extract features as follows.

Figure 3:
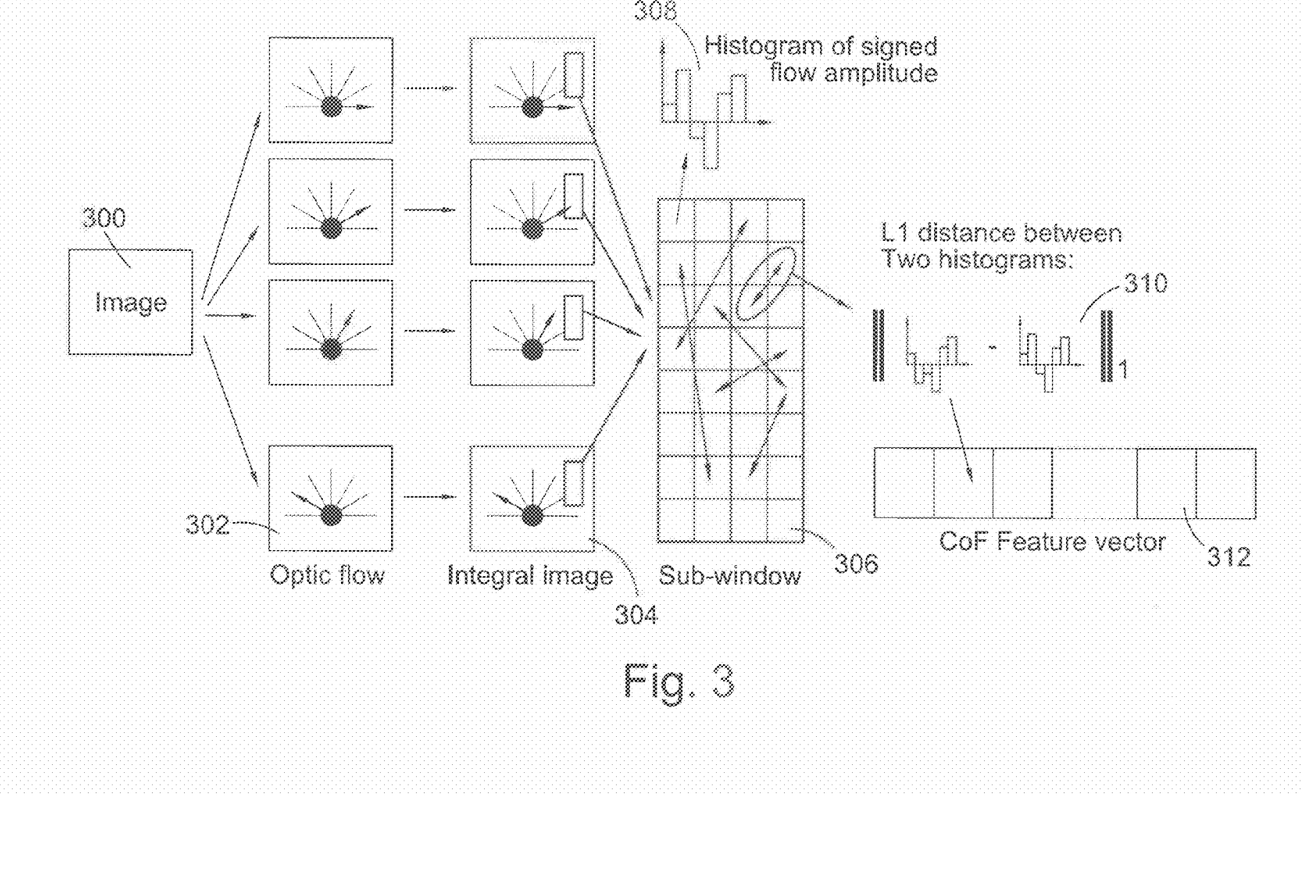
FIG. 3 is a schematic diagram showing a method for extracting features from a video sequence.

FIG. 3 shows a schematic of the method for extracting features.

A regularised flow field for the whole image 300 is calculated, for example using the technique described in M. Werlberger, W. Trobin, T. Pock, A. Wedel, D. Cremers, and H. Bischof, 'Anisotropic Huber-L1 optical flow', BMVC, 2009.

The flow field 302 includes a direction and magnitude for the optic flow at a number of points on the image 300.

The optic flow field is stored as separate channels F(i) according to the discrete orientations $i=1 \ldots b$ that will later be used for the bins in the histograms of optic flow. Thus, the channels F(i) represent the output that correspond to a particular range of directions and a magnitude. The outputs to channels are stored as integral images 304 (also know as summed area tables), as this allows the histograms to be efficiently calculated for cells of target regions of the image.

Histograms of optic flow are calculated for cells of the sub region 306. The histograms 308 are constructed by calculating the sum over the area of the cell of interest $w_k(n,m)$ of each channel of $\{F(i)\}$. Thus, the i-th element of the histogram is computed as:

$$h(m,n;i)=\int_{w_k(m,n)}F(u,v;i)dudv, i=1,\ldots,b$$

If the video sequence is obtained from a moving camera, the computed flow field will be influenced by the camera motion. This motion can be compensated for by subtracting the dominant image flow before generating the histograms. The dominant background flow is calculated by averaging the flow globally observed in the target region sub-window, R. The corrected value of the i-th element of the histogram is given by:

$$h'(m,n;i)=h(m,n;i)-\int_R F(u,v;i)dudv$$

The range of bins for the histograms and also the discrete orientations in which the directions of the optic flow field are stored can either cover 180 degrees or 360 degrees. Where the range of the bins is 180 degrees, when calculating the histograms the flow field is included with both positive and negative values. So for example a field with a direction of 30 degrees would be included in the same bin as a field at 270 degrees with an opposite sign. In the case where the bins span 360 degrees, the angular coverage of each bin will be doubled, and only the magnitude will be used in the calculation of the histogram.

Comparisons of the histograms 308 for pairs of cells within R are then made. Using the $L_1$ norm 310, each pair of cells outputs a scalar value. The scalar values are combined to produce a CoF feature vector 312.

In the case where the bins cover 360 degrees, the comparison of the histograms is carried out using histogram intersection to give a scalar value calculated from the sum of comparing each pair of bins.

The CoF feature vector and the HOG feature vector for a given region are input into a classifier based on a random decision forest to classify the feature within the target region.

Two independent random forests are trained using the CoF and the HOG features respectively. The class probability distributions are combined at the leaf nodes of the random forests across all the trees in the two forests.

Figure 4:
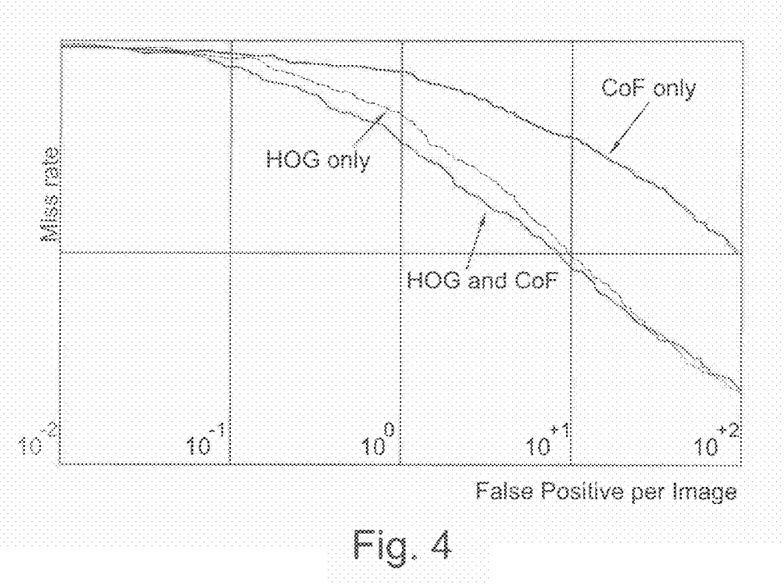
FIG. 4 is a graph showing a comparison of the results for pedestrian detection in video sequences.

FIG. 4 shows a comparison of the results for pedestrian detection in video sequences using the co-occurrence flow method described above alone (CoF only), the histograms of orientated gradient method alone (HOG only) and a method in which pedestrians are detected using the CoF method and HOG method in combination as described in reference to FIG. 3 (HOG and CoF). As can be seen from FIG. 4, the combined method performs better than either of the methods alone.

Figure 5:
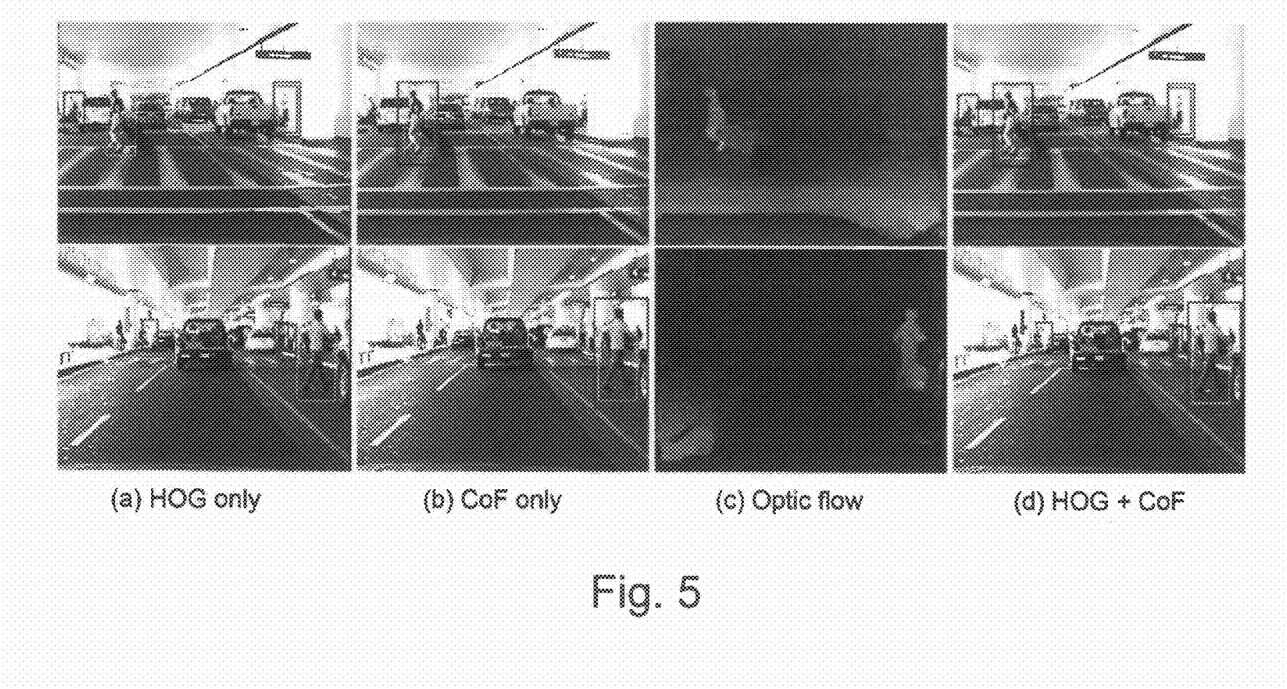
FIG. 5 shows examples of pedestrian detection in frames of a video sequence.

FIG. 5 shows two examples of pedestrian detection using (a) HOG only, (b) CoF only and (d) HOG and CoF in combination. FIG. 5 also shows the Optic Flow (c) used in the CoF method. The optic flow is colour coded according to magnitude. In FIGS. 5 (a), (b) and (d), the purple (black in monochrome images) boxes show features detected as pedestrians and the green (white in monochrome images) boxes show features that should have been detected as pedestrians.

In the example shown in the upper images of FIG. 5, the woman in the road with a suitcase is missed by HOG, but detected by CoF. It is noted here that CoF is capable of detecting pedestrians in motion, for example when crossing a road, which is an important application of pedestrian detection. However, the CoF method does not detect stationary pedestrians which are detected by HOG.

In the lower images of FIG. 5, the CoF method detects the man walking to the right hand side of the frame. This is missed by HOG, probably due to the dark background in combination with the dark coloured trousers of the pedestrian.

Thus, the use of the two methods in combination can detect pedestrians in a range of roles and thus the methods described in the present application compliment known methods such as histograms of gradient.

Figure 6:
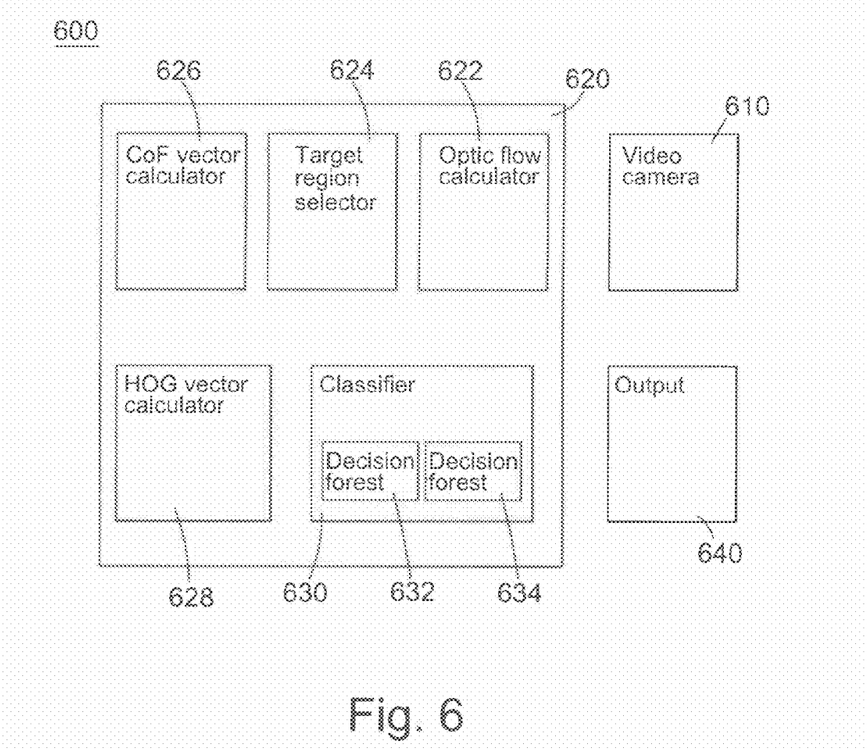
FIG. 6 shows a block diagram of a pedestrian detection system.

FIG. 6 shows a pedestrian detection system. The pedestrian detection system 600 has a video camera 610 and a video analysis module 620. The video analysis module has a optic flow field calculator 622, a target region selector 624, a co-occurrence of flow vector calculator 626, a histograms of orientated gradient vector calculator 628 and a classifier 630. The classifier stores two random decision forests: a co-occurrence of flow decision forest 632 and a histograms of orientated gradient decision forest 634. The analysis module is attached to an output module 640.

The output module may be a video screen which can show the video sequence captured by the video camera 610 with pedestrians highlighted. The output module may output a signal that indicates the proximity of pedestrians or a signal that can be used to gather statistics on the number of pedestrians passing a particular point. The pedestrian detection system 600 may be integrated into an automotive vehicle. In this application, the video camera 610 is directed in the direction of travel of the automotive vehicle. A number of cameras may be located on the automotive vehicle and the output from each of the cameras may be constantly monitored by the analysis module 620. Alternatively, the analysis module may be configured to switch to one of the video cameras depending on the direction of motion of the automotive vehicle.

In use, the video camera 610 captures the video sequence of the field of view in the direction of motion of the automotive vehicle. The optic flow calculator 622 calculates an optic flow field of the frames of the video sequence. The target region selector 624 selects target regions of frames of the video sequence. The target regions are selected by carrying out an analysis of the frames of the video sequence using the histograms of oriented gradient method discussed above. For a target region, the co-occurrence of flow vector calculator 626 calculates a vector of co-occurrence of optical flow. The co-occurrence of flow vector calculator 626 compensates for the motion of the vehicle in the video sequence by subtracting the dominant flow over the target region when calculating the co-occurrence of flow vector. The vector is calculated by comparing histograms of optic flow for bells of the target region.

The histograms of oriented gradient vector calculator 628 also calculates a vector for the target region. The vector calculated by the co-occurrence of flow vector calculator 626 and the vector calculated by the histograms of oriented gradient vector calculator 628 are input into classifier 630. The classifier 630 uses the vectors to classify the feature in the target region as a pedestrian or not a pedestrian. The classifier 630 uses stored random decision forests 632 and 634 to classify the vectors as either relating to a pedestrian or not a pedestrian. The output module 640 outputs a signal for each frame of the video sequence indicating the presence or absence of pedestrians.

The output signal may be a video sequence with pedestrians highlighted in it. This video sequence may be displayed on a video screen visible to the driver of the automotive vehicle. The output signal may operate an alarm to alert the driver to the presence of pedestrians in the path of the automotive vehicle. The output signal may be directly connected to the controls of the car and cause the car to slow down or divert its path due to the close proximity of a pedestrian.

The pedestrian detection system 600 may be integrated into a pedestrian monitoring system for use a public building such as a shopping centre or station. The video cameras may be fixed with a view of pedestrians entering or exiting the building. The output signal may indicate the number of pedestrians entering and exiting the building at any one time. Thus, the pedestrian detection system can generate statistics on the number of visitors to a building and may calculate the number of people inside the building at any one time.

In place of random decision forests, other statistical classifiers could be used to classify features in a video sequence based on the result of the comparison of histograms. For example, a linear classifier such as a support vector machine (SVM) could be used. A classifier trained using adaptive boosting (AdaBoost) could also be used.

The different types of classifiers could also be used to classify features in the analysis of static features of the frames. For example, during the analysis using HOG, a linear classifier or a boosted classifier could be used.

While certain embodiments have been described, these embodiments have been presented by way of example only, and are not intended to limit the scope of the inventions. Indeed, the novel methods and systems described herein may be embodied in a variety of other forms; furthermore, various omissions substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of classifying a feature in a video sequence, the method comprising
    selecting a target region of a frame of the video sequence, the target region containing the feature;
    dividing the target region into a plurality of cells;
    calculating histograms of optic flow within cells of the plurality of cells;
    comparing the histograms of optic flow for pairs of cells; and
    assigning the feature to a class based at least in part on the result of the comparison.

2. The method of claim 1, further comprising performing image analysis on the target region, and wherein assigning the feature to a class is based on the image analysis and the result of the comparison.

3. The method of claim 2, wherein performing image analysis comprises calculating histograms of orientated gradient for a static image corresponding to the target region.

4. The method of claim 1, wherein assigning the feature to a class comprises using a random decision forest classifier.

5. The method of claim 1, wherein assigning the feature to a class comprises determining if the feature corresponds to a pedestrian in the video sequence.

6. The method of claim 1, wherein an optic flow field in each cell comprises a plurality of vectors indicating a magnitude and a direction and calculating histograms of optic flow comprises assigning each vector of optic flow within a cell to a bin based on the direction of the vector.

7. The method of claim 6, further comprising storing the optic flow field for the frame as plurality of channels, wherein each channel corresponds to a range of orientations for the vector of optic flow.

8. The method of claim 7, wherein the optic flow field is stored as an integral image.

9. The method of claim 6, further comprising compensating camera motion in the video sequence by subtracting a globally observed optic flow for the target region from the optic flow field in each cell.

10. A non-transitory computer readable medium carrying computer executable instructions which when executed on a computer cause the processor to carryout the method according to claim 1.

11. A video analysis system comprising:
    an input module operable to receive a frame of a video sequence;
    a storage module;
    a processor operable to select a target region of the frame, the target region containing the feature; divide the target region into a plurality of cells; calculate histograms of optic flow within cells of the plurality of cells; compare the histograms of optic flow for pairs of cells; and assign the feature to a class based at least in part on the result of the comparison; and
    an output module operable to output information indicating the class assigned to the feature.

12. The system of claim 11, the processor being further operable to perform image analysis on the target region, and wherein assigning the feature to a class is based on the image analysis and the result of the comparison.

13. The system of claim 12, wherein the processor is operable to perform image analysis by calculating histograms of orientated gradient for a static image corresponding to the target region.

14. The system of claim 11, wherein the processor is operable to assign the feature to a class using a random decision forest classifier.

15. The system of claim 11, wherein the processor is operable to assign the feature to a class by determining if the feature corresponds to a pedestrian in the video sequence.

16. The system of claim 11, wherein an optic flow field in each cell comprises a plurality of vectors indicating a magnitude and a direction and the processor is operable to calculate histograms of optic flow by assigning each vector of optic flow within a cell to a bin based on the direction of the vector.

17. The system of claim 16, further comprising storage for storing the optic flow field for the frame as plurality of channels, wherein each channel corresponds to a range of orientations for the vector of optic flow.

18. The system of claim 17, wherein the optic flow field is stored as an integral image.

19. The system of claim 16, the processor being further operable to compensate for camera motion in the video sequence by subtracting a globally observed optic flow for the target region from the optic flow field in each cell.

* * * * *